US006859593B2

(12) United States Patent
Fournier et al.

(10) Patent No.: US 6,859,593 B2
(45) Date of Patent: Feb. 22, 2005

(54) METHOD OF MANUFACTURING AN OPTICAL FIBER RIBBON, AND AN OPTICAL RIBBON

(75) Inventors: Jérôme Fournier, Lyons (FR); Olivier Pinto, Lyons (FR); Peter Elisson, Boras (SE); Magnus Gunnarsson, Grimsas (SE); Mats Lanned, Sjötofta (SE)

(73) Assignee: Nexans (FR)

( * ) Notice: Subject to any disclaimer, the term of this patent is extended or adjusted under 35 U.S.C. 154(b) by 0 days.

(21) Appl. No.: 10/713,555

(22) Filed: Nov. 13, 2003

(65) Prior Publication Data

US 2004/0131319 A1 Jul. 8, 2004

(30) Foreign Application Priority Data

Nov. 18, 2002 (FR) .............................. 02 14369

(51) Int. Cl.[7] .................................. G02B 6/44
(52) U.S. Cl. ........................................ 385/114
(58) Field of Search ................... 385/100–114

(56) References Cited

U.S. PATENT DOCUMENTS 5,442,722 A    8/1995  DeCarlo ............... 385/114
6,434,305 B1   8/2002  Lochkovic et al. ........ 385/114

FOREIGN PATENT DOCUMENTS

| EP | 950908 A2 | 10/1999 |
| EP | 1216969   | 6/2002  |
| WO | 9718493   | 5/1997  |
| WO | 0175498   | 10/2001 |

OTHER PUBLICATIONS

French Search Report dated Jul. 24, 2003, FA 626416, FR 0214369.

*Primary Examiner*—Javaid H. Nasri
(74) *Attorney, Agent, or Firm*—Sofer & Haroun, LLP

(57) ABSTRACT

The present invention relates to a method of manufacturing an optical fiber ribbon comprising the following steps: arranging N groups of optical fibers so that the fibers in any one group are disposed in the same plane, applying a first layer of a first liquid resin settable under the action of UV type radiation onto each group of optical fibers to form first casings, applying a second layer of a second liquid resin settable under the action of UV type radiation disposed to link together the adjacent first casings, and applying a single irradiation step to the second layer and the first layers using UV type radiation in order to form the first matrices and to form the "link" second matrix.

10 Claims, 4 Drawing Sheets

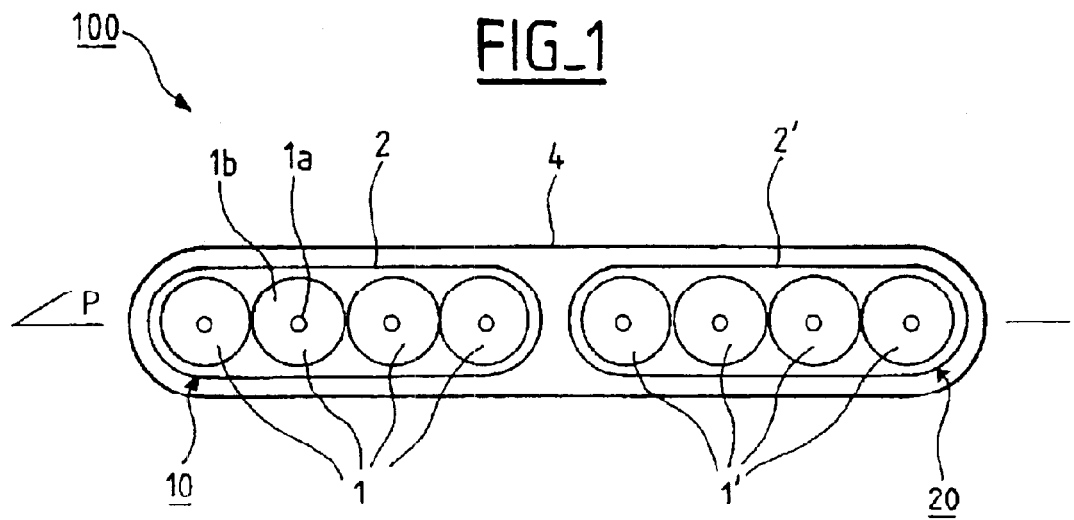
FIG_1
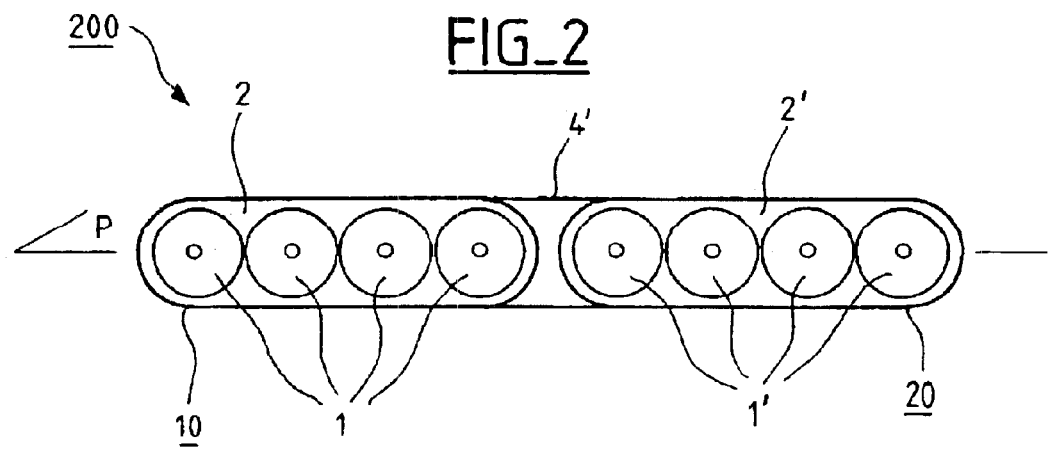
FIG_2
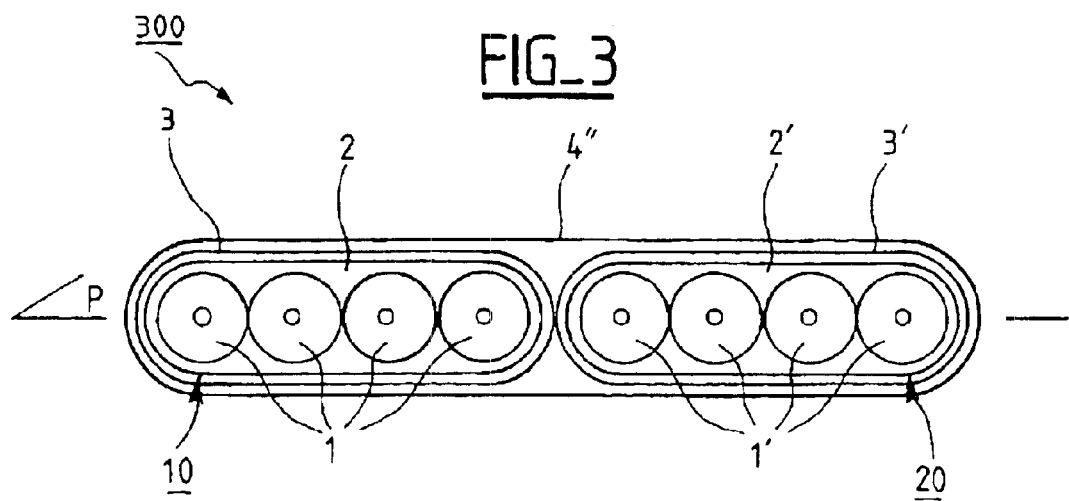
FIG_3

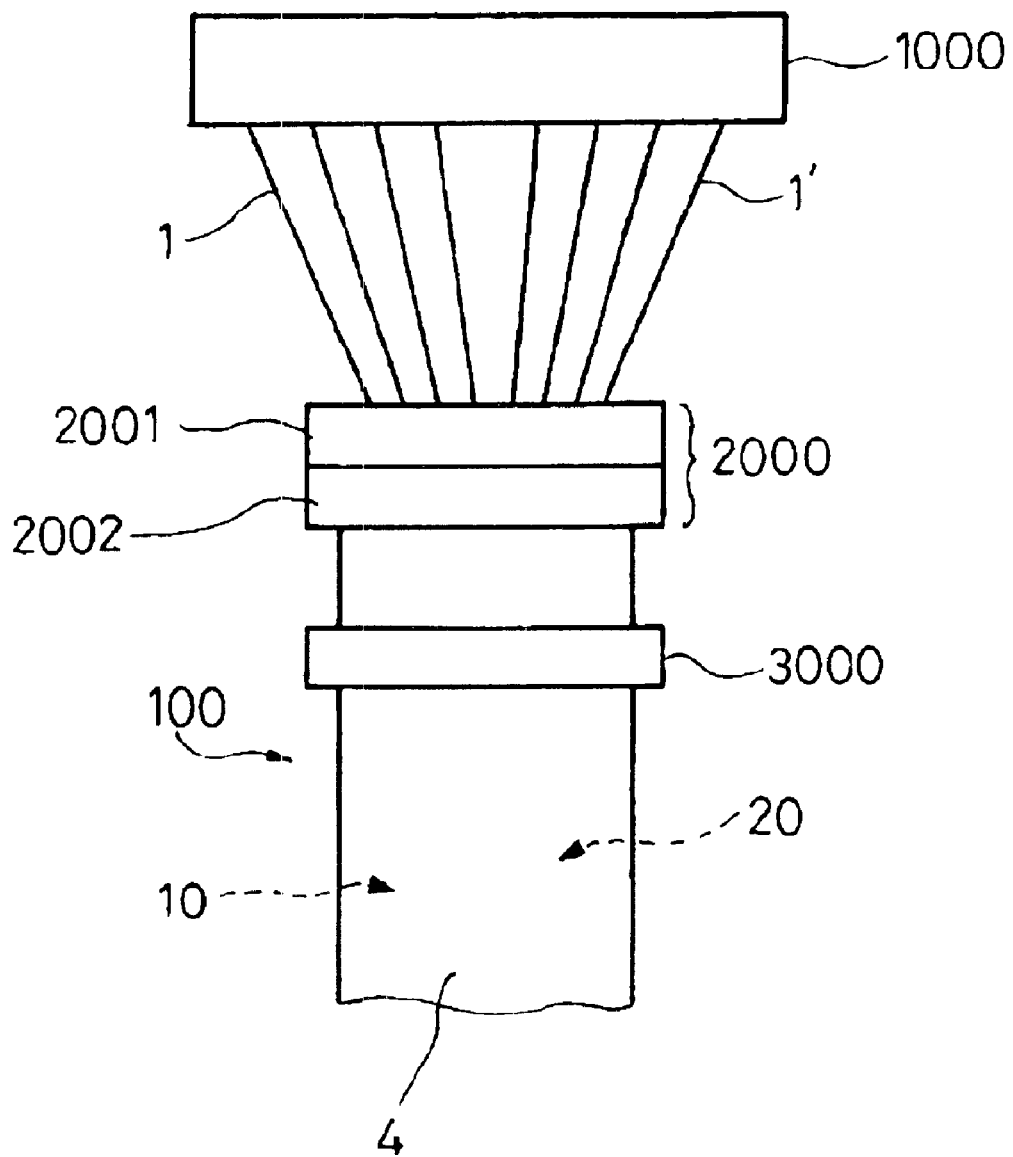

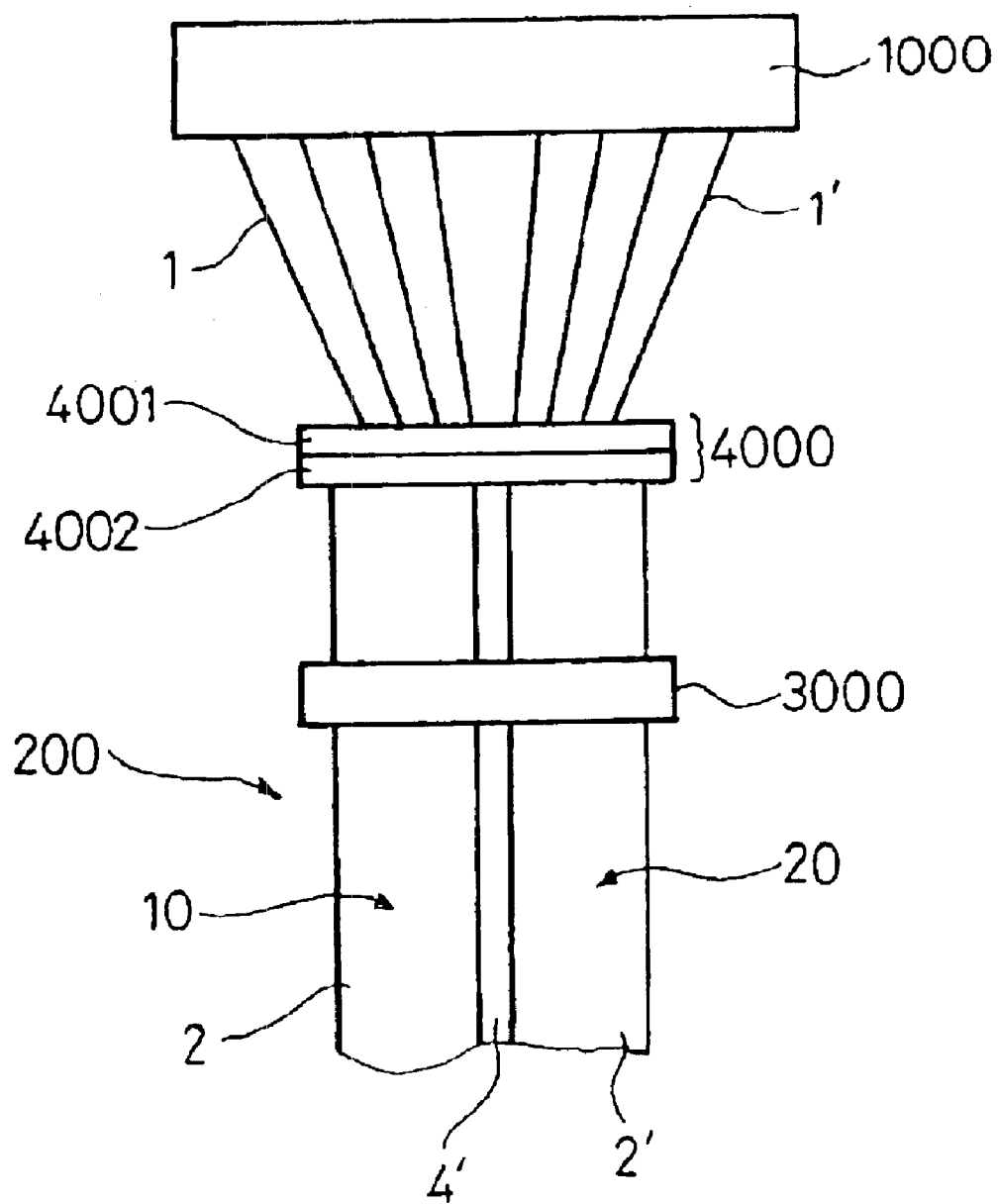

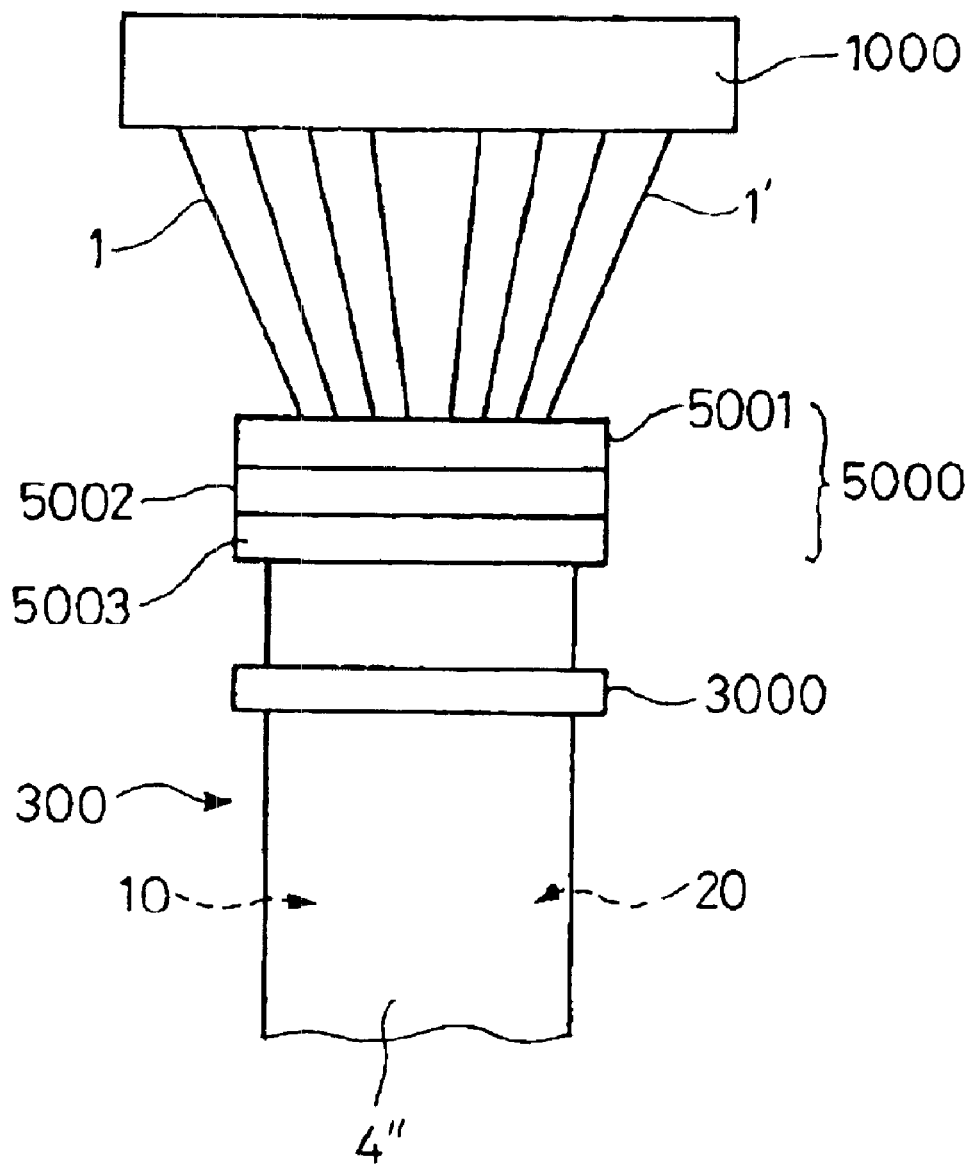
FIG_6

METHOD OF MANUFACTURING AN OPTICAL FIBER RIBBON, AND AN OPTICAL RIBBON

RELATED APPLICATIONS

This application is related to and claims the benefit of priority from French Patent Application No. 02 14369, filed on Nov. 18, 2002, the entirety of which is incorporated herein by reference.

FIELD OF THE INVENTION

The present invention relates to the field of optical fiber telecommunications cables, and more precisely it relates both to a method of manufacturing an optical fiber ribbon and to an optical fiber ribbon.

BACKGROUND OF THE INVENTION

In conventional manner, optical fiber ribbons are used in telecommunication cables for conveying information optically.

Document EP 0 950 908 discloses an optical fiber ribbon comprising, for example, two subsets disposed in a common plane, the subsets being connected to each other and being separable so as to make them easier to install respectively in optical systems.

More precisely, each subset comprises a group of optical fibers arranged in a common plane, said group being coated in a first matrix forming a first casing and obtained by irradiating a first liquid resin that is cross-linked under the action of ultraviolet (UV) radiation. The subsets are connected to one another by a matrix forming a common casing and obtained by irradiating a second liquid resin that is cross-linked under the action of UV radiation.

The method of manufacturing the optical fiber ribbon comprises the following successive steps:

an operation of forming each subset of optical fibers, this operation comprising:

arranging N groups of optical fibers so that the fibers in any one group are disposed in the same plane;

applying a first layer on each group of optical fibers so as to encase them, each first layer being of a first liquid resin that is cross-linkable under the action of IJV radiation; and irradiating the first layers with UV radiation to form first cross-linked matrices;

a ribbon-forming operation comprising:

applying a second layer onto the first matrices in order to form a common casing connecting together the N subsets, said second layer being made of a resin that is cross-linkable by UV radiation; and irradiating the second layer with UV radiation in order to form a second cross-linked matrix.

The productivity of that method of manufacturing an optical fiber ribbon is low because the method requires multiple operations of changing machine and putting work into place.

OBJECTS AND SUMMARY OF THE INVENTION

An object of the invention is to develop a method of manufacturing an optical fiber ribbon made up of a plurality of subsets provided with respective casings that are disposed in a common plane, that are separable, and that are connected together by a "link" matrix, said method presenting satisfactory productivity (reducing the time and/or the cost of manufacturing the ribbon) and preferably being simple to implement.

To this end, the invention provides a method of manufacturing an optical fiber ribbon comprising a number N greater than 1 of separable subsets disposed in a common plane, the method comprising the following steps:

arranging N groups of optical fibers so that the fibers in any one group are disposed in the same plane;

applying a first layer onto each group of optical fibers in order to form first casings, each first layer being of a first liquid resin that is settable under the action of UV type radiation;

applying "first" irradiation to the first layers using UV type radiation in order to form first matrices;

applying a second layer arranged to connect together adjacent first casings, said second layer being of a second liquid resin settable under the action of UV type radiation, all of the optical fibers being disposed in a common plane; and applying "second" irradiation to the second layer using UV type radiation to form a second matrix referred to as a "link" matrix;

wherein said first and second irradiation steps correspond to a single irradiation step, and wherein said application of the second layer is performed before said single irradiation step.

The method of the invention makes it possible to obtain the ribbon in a single step, i.e. without prior manufacture of each subset. There is no longer any need to use a plurality of ISV type radiation sources in succession, thereby making manufacture faster, less expensive, and enabling the manufacturing installation to take up less space.

The term "settable liquid resin" is used herein to mean a resin based on a cross-linkable oligomer and/or polymer, or a resin based on a polyrnerizable oligomer and/or monomer, or a mixture thereof.

In addition, in the prior art method having two main steps, the thickness of the first casing is such that the subsets have good mechanical strength prior to being encapsulated in order to avoid them being damaged. The method of the invention presents the advantage of enabling the subsets to be manufactured with first casings of minimized thickness.

The invention also relies on the idea that although the second resin in the liquid state comes into contact with the first resin in the liquid state, there is no significant interdiffusion over a period of time expressed in days, i.e. much longer than the few seconds required for applying the second layer on the first layer.

Naturally, the first resins may be identical to one another and correspond to a single first resin.

The method of the invention is preferably such that the link matrix is made of a material that does not bond chemically with any of the matrices of the casings of the subsets so as to make the ribbon more peelable, i.e. so as to make it easier to separate the second layer from the first layer.

Thus, in a first implementation of the invention, when said first and second resins are settable by the same chemical process selected from the radical process and the cation process, the method may include a step of applying a barrier layer between each first layer and the second layer.

The barrier layer is made of a composition that is selected to prevent any covalent type chemical bonding between the reactive groups in each first layer and those in the second layer. In addition, this composition does not interdiffuse with either the first or the second layers.

Preferably, said barrier layer is made of a composition selected from siloxane-based polymers, olefin resins, mineral oils, and fatty alcohols.

In a second implementation of the invention, the first resins may be settable by one of the radical process and the cation process, and the second resin is settable by the other one of the cation process and the radical process.

To make the method simple to implement, it is possible to use a single die of suitable structure, i.e. provided with two chambers, the first chamber containing a first resin and the second chamber containing the second resin.

In addition, in this second implementation, at least one of the first and second resins may contain a peeling agent.

The peeling agent is preferably selected from polysiloxane-based polymers.

According to another characteristic, the manufacturing method of the invention may include passing said optical fiber ribbon through an infrared oven after said step of applying irradiation using UV type radiation.

Preferably, one of the resins settable by the cation process contains compounds based on oxirane such as bisphenol F or A glycidyl ethers, novolac or cycloaliphatic epoxy resins, epoxy silicone polymers, oxetanes, and vinyl or allyl ether monomers.

This resin may also contain photoinitiators such as oniurn salts, for example.

The invention also provides an optical fiber ribbon obtained by the above-defined method of manufacture, the ribbon comprising a plurality of separable subsets of optical fibers disposed in a common plane, each subset comprising a group of optical fibers arranged in said plane, the group being coated by a first matrix in the form of a first casing obtained by irradiating a first liquid resin settable by UV type radiation, each first casing being connected to the adjacent first casing(s) by a second matrix referred to as a "link" matrix and obtained by irradiating a second liquid resin settable by UV type radiation, wherein the first matrices are obtained by one of the radical process and the cation process, and the link matrix is obtained by the other one of the cation process and the radical process.

The first matrices are obtained in a manner that does not make use of the same chemical process as that which is used for obtaining the link matrix. In other words, the reactive groups of each first resin are not liable to react with the reactive groups of the second resin in order to form a covalent type chemical bond. The peelability of the link matrix of the invention is thus satisfactory: removing the second matrix is not likely to damage, e.g. to tear, the casing of each subset.

Concerning the structure of the subset of the invention, the optical fibers in the same group may contact one another, so as to ensure that the subset is of small size, or they may be spaced apart from one another by the first casing. In addition, the adjacent subsets may be in contact with one another in order to ensure that the ribbon is of small size, or they may be spaced apart by the link matrix. The thickness of the first casing may be uniform or it may be reduced on either side of each subset.

The link matrix may form a common casing for all of the first casings in order to provide improved protection for the subsets and improve mechanical strength for each subset. The thickness of the common casing may be uniform or it may be reduced on either side of the subsets.

BRIEF DESCRIPTION OF THE DRAWINGS

The features and advantages of the invention appear clearly on reading the following description made by way of non-limiting and illustrative examples and made with reference to the accompanying figures, in which:

FIG. 1 is a diagram of an optical fiber ribbon in a first preferred embodiment of the invention;

FIG. 2 is a diagram of an optical fiber ribbon in a second preferred embodiment of the invention;

FIG. 3 is a diagram of an optical fiber ribbon in a third preferred embodiment of the invention;

FIG. 4 is a diagram showing the implementation of a method of manufacturing the optical fiber ribbon of FIG. 1, in a first preferred implementation of the invention;

FIG. 5 is a diagram showing the implementation of a method of manufacturing the optical fiber ribbon of FIG. 2, in a second preferred implementation of the invention; and FIG. 6 is a diagram showing the implementation of a method of manufacturing the optical fiber ribbon of FIG. 3, in a third preferred implementation of the invention.

MORE DETAILED DESCRIPTION

Elements that are common to the various embodiments of the invention are designated by the same references.

FIG. 1 is a diagram of an optical fiber ribbon 100 in a first preferred embodiment of the invention.

By way of example, the optical fiber ribbon 100 comprises two subsets of optical fibers 10, 20 disposed in a common plane P and separable from each other.

Each subset 10, 20 comprises a group 1, 1', e.g. four optical fibers disposed in said plane P.

Each optical fiber is conventionally constituted by a core 1a surrounded by optionally-colored covering 1b for identifying each fiber.

Each group of four optical fibers 1, 1' is covered in a respective first matrix 2, 2' in the form of a first casing, preferably obtained by a radical process, by irradiating a first liquid resin that can be set by UV type radiation. By way of example, the first resin, referred to as "resin $A_1$", is based on acrylate and corresponds, for example, to the product sold by DSM Desotech under the name Cablelite® 950-706.

The first matrices 2, 2' are connected together by a link matrix 4 that preferably forms a casing that is common to both of the first matrices 2, 2'. This link matrix 4 is obtained by a cation process, by irradiating a second liquid resin that is settable by UV type radiation, referred to as "resin $B_1$".

By way of example, the second resin $B_1$ contains oxirane compounds and presents the following formulation, for example:

90 parts by weight of Cyracure LJVR 6105 (Union Carbide);

7.5 parts by weight of TONE 0301 (Union Carbide);

1 part by weight of a photoinitiator such as Rhodorsil Photoinitiator 2074 (Rhodia);

1 part by weight of a peeling agent, preferably based on polysiloxane, and settable, for example, under the action of UV radiation such as Silcolease UV POLY 205 (Rhodia) which contains a photoinitiator and a polydimethyl siloxane having cycloaliphatic epoxy functions; and 0.5 parts by weight of Chloropropoxy thioxanthone (FirstChem).

FIG. 2 is a diagram of an optical fiber ribbon 200 in a second preferred embodiment of the invention.

Like the optical fiber ribbon 100, the ribbon 200 comprises two subsets of optical fibers 10, 20 disposed in a common plane P and separable from each other. Each subset 10, 20 comprises a group 1, 1', e.g. four optical fibers arranged in said plane P.

Similarly, each group of four optical fibers 1, 1' is coated in a first matrix 2, 2' forming a first casing and obtained preferably by a radical process, by irradiating a first liquid resin that is settable by UV type radiation, referred to as "resin $A_2$", e.g. identical to the resin $A_1$.

Unlike the optical fiber ribbon 100, the first matrices 2, 2' are connected to each other by a link matrix 4' which does not fully encapsulate either of the first matrices 2, 2'.

This link matrix 4' is obtained by a cation process, by irradiating a second liquid resin that is settable by UV type radiation referred to as "resin $B_2$", e.g. identical to the resin $B_1$.

The subsets 10, 20 are presented as being spaced apart from each other, but they could equally well be in contact, providing they can be separated without damage.

FIG. 3 is a diagram of an optical fiber ribbon 300 constituting a third preferred embodiment of the invention.

Like the optical fiber ribbon 100, the ribbon 300 comprises two subsets of optical fibers 10, 20 disposed in a common plane P and separable from each other. Each subset 10, 20 comprises a group 1, 1', e.g. four optical fibers arranged in said plane P.

Similarly, each group of four optical fibers 1, 1' is coated in a first matrix 2, 2' forming a first casing and preferably obtained by a radical process, by irradiating a first liquid resin that is settable by UV type radiation, referred to as "resin $A_3$", e.g. identical to resin $A_1$.

The first matrices 2, 2' are connected together by a link matrix 4" obtained by a radical process, by irradiating a second liquid resin that is settable by UV type radiation, referred to as "resin $B_3$", e.g. identical to resin $A_3$.

Unlike the optical fiber ribbon 100, the link matrix 4" and each of the first matrices 2, 2' are separated by a barrier layer 3, 3' made of a composition referred to as "C", which layer is necessary insofar as the resins $A_3$ and $B_3$ are set using the same process.

The liquid composition C is optionally responsive to UV radiation and is selected, for example, from polymers based on siloxane, olefin resins, mineral oils, and fatty alcohols.

By way of example, for resins $A_3$, $B_3$ that are settable by a radical process, it is possible to select a composition C that is settable by a cation process under the action of UV radiation, such as Silcolease UV POLY 205 (Rhodia), or a composition that is not settable under the action of UV radiation, such as a dimethyl siloxane polymer such as Rhodorsil 47V350 (Rhodia)

In a variant, the resins $A_3$, $B_3$ are obtained by the same cation process. In this variant, it is possible to select a composition C that is not settable under the action of LW radiation, such as Rhodorsil 47V350 or a composition that is settable by a radical process under the action of UV radiation, e.g. having the following formulation:

- 70 parts by weight of a polydimethyl siloxane carrying acrylate groups, e.g. the product Tego RC 902 (Th. Goldschmidt AG);
- 30 parts by weight of another polydimethyl siloxane carrying acrylate groups, e.g. the product Tego RC 711 (Th. Goldschmidt AG); and
- 3 parts by weight of a photoinitiator such as the product Esacure KIP100F (Lamberti S.p.A.) FIG. 4 is a diagram showing the implementation of a method of manufacturing the optical fiber ribbon of FIG. 1 in a first preferred implementation of the invention.

The overall view of the devices used is a side view.

The method comprises firstly arranging the two groups of four optical fibers 1, 1' coming from an unwinding station 1000, in which arrangement all of the optical fibers are disposed in the common plane P.

Thereafter, the two groups of four optical fibers 1, 1' pass through a die 2000 having two successive chambers 2001, 2002 respectively, one chamber containing the first liquid resin $A_1$ and the other the second liquid resin $B_1$. At the outlet from the first chamber 2001, each of the two groups of optical fibers is encased in a first layer of the first resin $A_1$. The first layers do not come into contact with each other.

On leaving the second chamber 2002, the second layer of the second resin $B_1$ encases both of the first layers and connects them together.

Finally, a single step of irradiation by means of a source 3000 using UV type radiation is applied to the first and second layers serving respectively to form the first matrices of the two subsets (not shown) and the link matrix 4 in the form of a common casing for the ribbon.

FIG. 5 is a diagram of implementation of a method of manufacturing the optical fiber ribbons of FIG. 2 in a second preferred implementation of the invention.

The overall view of the devices used is a side view.

The two groups of four optical fibers 1, 1' pass through a die 4000 provided with two successive chambers 4001, 4002 respectively, one containing the first liquid resin $A_2$ and the other the second liquid resin $B_2$. On leaving the first chamber 4001, each of the two groups of optical fibers is encased in a first layer of the first resin $A_2$. These first layers preferably do not come into contact with each other. On leaving the second chamber 4002, a second layer of the second resin $B_2$ is deposited in order to connect together the first two layers without encasing them.

Finally, a single step of irradiation by means of a source 3000 of UV type radiation is applied to the first and second layers serving respectively to form the first matrices 2, 2' of the two subsets 10, 20 and the link matrix 4' of the ribbon 200.

FIG. 6 is a diagram showing implementation of a method of manufacturing the optical fiber ribbon of FIG. 3 in a third preferred implementation of the invention.

The overall view of the devices used is a side view.

The two groups of four optical fibers 1, 1' pass through a die 5000 provided with three successive chambers 5001, 5002, 5003 respectively, the first containing the first liquid resin $A_3$, the second containing the liquid composition C, and the third containing the second liquid resin $B_3$.

On leaving the first chamber 5001, each of the two groups of optical fibers is encased by a first layer of the first resin $A_3$. The first layers preferably do not make contact with each other.

On leaving the second chamber 5002, a barrier layer of the composition C covers each of the first layers.

On leaving the third chamber 5003, a second layer of the second resin $B_3$ encases both of the first layers and connects them together.

Finally, a single step of irradiation by means of a source 3000 of UV type radiation is applied to the first layers, the barrier layer, and to the second layer serving respectively to form the first matrices of the two subsets (not shown), the barrier layer, and the link matrix 4" in the form of a common casing for the ribbon 300.

The barrier layer which limits the formation of covalent chemical bonds between each of the first layers and the second layer may equally well remain liquid or it may set, depending on the composition C that is selected.

In a variant (not shown) of any one of the implementations shown in FIGS. 4 to 6, after the step of irradiating with UV type radiation, the optical fiber ribbon is passed through an infrared oven in order to improve the degree of polymerization, if that should be necessary, in particular of matrices obtained by means of cations.

What is claimed is:

1. A method of manufacturing an optical fiber ribbon comprising a number N greater than 1 of separable subsets disposed in a common plane, the method comprising the following steps:

arranging N groups of optical fibers so that the fibers in any one group are disposed in the same plane; applying a first layer onto each group of optical fibers in order to form first casings, each first layer being of a first liquid resin that is settable under the action of UV type radiation;

applying "first" irradiation to the first layers using UV type radiation in order to form first matrices;

applying a second layer arranged to connect together adjacent first casings, said second layer being of a second liquid resin settable under the action of UV type radiation, all of the optical fibers being disposed in a common plane; and applying "second" irradiation to the second layer using UV type radiation to form a second matrix referred to as a "link" matrix;

wherein said first and second irradiation steps correspond to a single irradiation step, and wherein said application of the second layer is performed before said single irradiation step.

2. A method of manufacturing an optical fiber ribbon according to claim 1, wherein, when said first and second resins are settable by the same chemical process selected from the radical process and the cation process, the method includes applying a barrier layer between each first layer and the second layer.

3. A method of manufacturing an optical fiber ribbon according to claim 2, wherein said barrier layer is made of a composition selected from siloxane-based polymers, olef in resins, mineral oils, and fatty alcohols.

4. A method of manufacturing an optical fiber ribbon according to claim 1, wherein the first resins are settable by one of the radical process and the cation process, and the second resin is settable by the other one of the cation process and the radical process.

5. A method of manufacturing an optical fiber ribbon according to claim 4, wherein at least one of the first and second resins contains a peeling agent.

6. A method of manufacturing an optical fiber ribbon according to claim 5, wherein the peeling agent is preferably selected from polysiloxane-based polymers.

7. A method of manufacturing an optical fiber ribbon according to claim 1, the method including passing said optical fiber ribbon through an infrared oven after said single step of irradiation using UV type radiation.

8. A method of manufacturing an optical fiber ribbon according to claim 2, wherein one of the resins settable by the cation technique contains compounds based on oxirane such as bisphenol F or A glycidyl ethers, novolac or cycloaliphatic epoxy resins, epoxy silicone polymers, oxetanes, and vinyl or allyl ether monomers.

9. An optical fiber ribbon obtained by the method of manufacture according to claim 4 and comprising a plurality of separable subsets of optical fibers disposed in a common plane, each subset comprising a group of optical fibers arranged in said plane, the group being coated by a first matrix in the form of a first casing obtained by irradiating a first liquid resin settable by UV type radiation, each first casing being connected to the adjacent first casing(s) by a second matrix referred to as a "link" matrix and obtained by irradiating a second liquid resin settable by ISV type radiation, wherein the first matrices are obtained by one of the radical process and the cation process, and the link matrix is obtained by the other one of the cation process and the radical process.

10. An optical fiber ribbon according to claim 9, wherein the link matrix is obtained by the cation process.

* * * * *